Nov. 6, 1928.
A. M. McAFEE ET AL
1,690,990
PROCESS OF MAKING ALUMINUM CHLORIDE
Filed Sept. 26, 1927
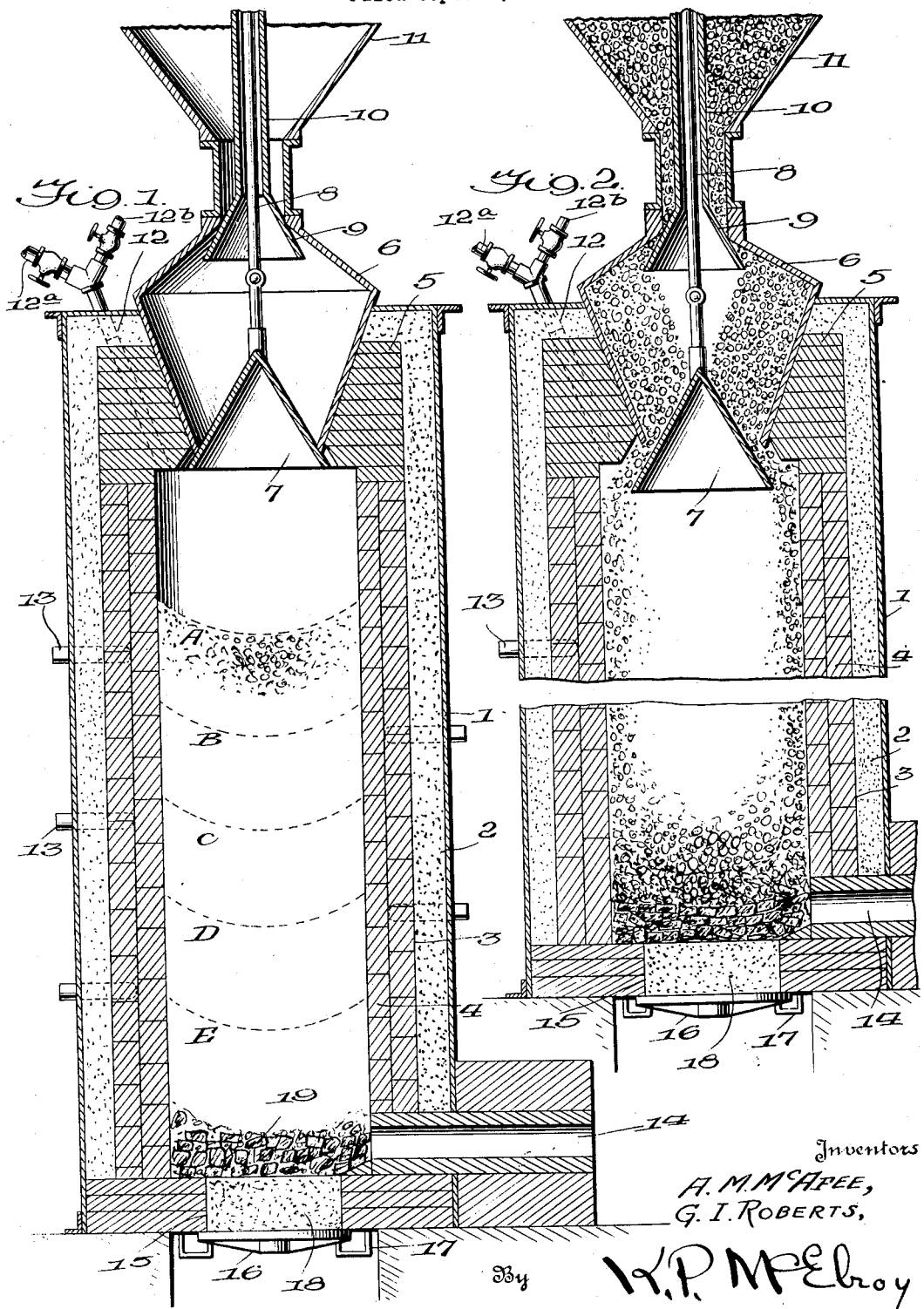
Inventors
A. M. McAFEE,
G. I. ROBERTS,
By W. P. McElroy
Attorney Patented Nov. 6, 1928.

1,690,990

UNITED STATES PATENT OFFICE.

ALMER M. McAFEE AND GERALD I. ROBERTS, OF PORT ARTHUR, TEXAS, ASSIGNORS TO GULF REFINING COMPANY, OF PITTSBURGH, PENNSYLVANIA, A CORPORATION OF TEXAS.

PROCESS OF MAKING ALUMINUM CHLORIDE.

Application filed September 26, 1927. Serial No. 222,108.

This invention relates to processes of making aluminum chloride; and it comprises a method of making aluminum chloride wherein one face of a hot pervious mass of alumina and carbon is subjected to the action of a heat-developing draft current containing chlorin, with removal of products of reaction from an opposite face, draft conditions being so arranged as to institute and maintain a localized zone of active reaction and development of heat away from the walls of the containing chamber; said localized zone of active reaction advantageously being axial in a vertical column of material and said column, in order to facilitate the axial passage of gases and vapors, being composed of coarser material near the axis and finer material near the periphery; all as more fully hereinafter set forth and as claimed.

The oldest method of making aluminum chloride is to subject a hot mixture of alumina and carbon to the action of chlorin in a heated retort. The process however is difficult to carry out on a large scale for a number of reasons; one difficulty being that of finding structural materials resisting the conjoint action of chlorin and carbon at the temperatures required for making aluminum chloride. While neither chlorin nor carbon alone has much action at any temperature on the ordinary materials used for ceramic purposes, hot chlorin in the presence of hot carbon converts most earthy matters into volatile chlorides. For example, in chlorinating ordinary impure bauxite containing silica, iron oxid and titanium oxid, in the presence of carbon at a temperature of, say 2000° F., all the bodies present are converted into volatile chlorides and the bauxite vanishes without leaving a residue. This action also occurs with clay and with all the ordinary ceramic materials exposed to hot chlorin in the presence of hot carbon.

In modern practice on the large scale manufacture of aluminum chloride, retorts are seldom used; the tendency being to use shafts or the like. The heat necessary for the reaction is conveyed into the chamber with ingoing materials. Sometimes heat is taken into the zone of reaction as sensible heat of the solid materials, the bauxite or the coke, or both, being preheated. Sometimes the chlorin is preheated also. All these methods however in practice suffer from the fact that the walls of the reaction chamber are attacked and while attack may be minimized by wall cooling in some manner, it nevertheless occurs. In the best practice using firebrick linings for these shaft chambers it is rare that the lining will stand up for as long as sixty days. Frequently the life of the lining is less.

In one advantageous way of making aluminum chloride from bauxite, the bauxite is mixed with carbon in the form of coke and the mixture is treated with chlorin mixed with oxygen. The oxygen delevops heat at the expense of some of the carbon, thereby keeping the reaction going. In this method however there is the usual trouble with regard to lining of the reaction chamber.

We have found that much better results are obtained and the life of chamber lining is prolonged indefinitely if the reaction be localized in a mass of a mixture of bauxite and coke at a point remote from the chamber lining. In so doing the inactive material next the lining shields it from the action of the hot gases. In the best way we have found of applying this invention, the localization of heat and activity is axial in a vertical column of material in a suitable shaft chamber. The shaft chamber may be built of any ordinary type of firebrick, and contain a charge of bauxite and coke replenished intermittently or continuously, as the case may be; the reaction supporting gases being transmitted through the material. The gases may be used either in up draft or down draft. Usually we employ down draft. In working in batch operation with a vertical column of coke and bauxite we usually interrupt introduction of the draft current before the entire column of the material undergoes reaction since very often to secure complete utilization of chlorin, a minimum thickness of two feet or so of a mixture of coke and bauxite is required in working with the ordinary draft velocity. In such cases, presuming that the total column is initially 8 to 10 feet high, we pass the gases usually through the column until the reaction zone is within about 18 inches of the bottom. We then interrupt the operation and replenish the column of solid material.

With concentration of the reaction in the axis of the column there is a tendency to channel; this tendency being greater with up draft than with down draft. However if the charge materials are not too coarse, as the channel lengthens and broadens, the materials along the wall tumble into it and undergo action in their turn. As stated, neither chlorin nor carbon per se has any action on clay or ceramic materials generally. The mixture of coke and bauxite lying next the lining does not attack it, whatever the temperature, as long as there is no material access of chlorin at this point. As the charge in the center perishes the materials next the wall tumble into the crater with down draft, leaving the walls exposed to chlorin and oxygen. But in the absence of carbon this exposure is not harmful. Axial localization of the zone of high activity and development of heat can be effected in various ways. One is to impinge a draft current on the axis of the upper face of the material in the shaft. Another, and simpler way is to charge material into the shaft in such a manner that the coarser material shall be axial while the finer material is at the periphery. Under these conditions the draft current of oxygen and chlorin or of air and chlorin as the case may be, passes preferentially through axially instead of peripherally. As the material in the center perishes by conversion into gases and vapors the peripheral finer material tumbles into the crater and is acted upon in its turn. There is an angle of repose crater in the top of the column and in batch operation this crater moves downward from top to bottom. Feeding means adapted to deliver coarser material at the center and finer material at the periphery generally give a concave upper face to the charge, which assists in starting the crater. Apart from the difference in resistance due to the presence of coarse material in the center, with a crater or concave depression existing in the top of the charge, the length of the path of travel for gases, and consequently the resistance, is less in the center for this reason.

In the accompanying drawing we have shown one form of apparatus useful in the performance of the process.

Figure 1 is a vertical section through the reaction chamber, and

Figure 2 is a similar segmental view illustrating the gradation of the material as it is charged.

In the showing, 1 is a shell of steel or cast iron within which is a heat insulating layer 2 of fine bauxite or the like. Within this shell is a circular firebrick shaft 3 having a firebrick lining 4. At the top, the shaft is built up with firebrick 5 to accommodate a hopper 6 normally closed by a bell 7, operated through rod and link mechanism 8. This hopper 6 is normally closed at the top by bell 9 operated by sleeve 10 in the main hopper 11 which contains the preliminary charge of material. This double hopper arrangement permits charging to the hopper 6, sealing that hopper by means of the bell 9 and then delivering the charge by means of the bell 7 to the interior of the shaft. At the top, the shaft is provided with the flue 12 in communication with pipes $12^A$ and $12^B$ delivering the reaction gases to be used, such as oxygen, chlorin and the like. Along its length the shaft is provided with diagrammatically shown pyrometers 13 for indicating and recording the temperature at various vertical heights. The aluminum chloride vapors formed in the reaction find exit from the apparatus through base outlet 14 leading to a condenser (not shown). At the bottom the shaft is provided with opening 15 for access to the interior when occasion demands and with a cover 16 held in place by clamps 17. The covers are protected by the ash insulation 18. Fine or dust-like particles of the charge in the shaft are kept from clogging outlet 14 by broken firebrick 19 or the like placed in the bottom of the shaft. On charging the shaft, bell 7 being open, the charge material falls as shown in Fig. 2; the material being directed against the wall of the shaft and tending to form an annular angle of repose pile with the concavity in the center. In so doing, however, heavier and larger particles roll toward the center of the shaft while lighter and smaller particles remain nearer the wall so that there is a gradation with finer particles near the walls and coarser particles toward the center of the shaft as the charge is built up. Feeding this way the column of material is substantially more permeable at the axis than at the periphery. And on feeding reaction-supporting gases at any point in the top chamber, these gases pass downward mainly axially and the initial concavity of the top is converted into a downwardly moving crater.

The present process is particularly useful in the manufacture of aluminum chloride by a method involving the use of oxygen and chlorin whereby high internal reaction temperatures are created, since it prevents overheating and erosion or corrosion of the lining of the apparatus.

In Fig. 1, we have indicated by means of the reference letters A, B, C, D, and E the appearance of the charge at different points or times as the charge is consumed. Ordinarily in a 10 foot shaft of 3 feet internal diameter operating batchwise we do not carry the process beyond the point where from 2.5 to 3 feet of charge material remains in the bottom of the shaft. The exact depth of the amount left varies with conditions, but we ordinarily stop passage of draft current when any chlorin is found going through with the exit vapors and gases.

The apparatus shown is adapted either for batch or for substantially continuous operation; the only difference being in the manner in which feed is effected. In the batch operation with the shaft charge consumed down to a certain point, bell 7 is opened and a new charge dropped in to fill the shaft to the height desired, (bell 9 being closed at this time) say within 2 feet or so of the top. It is always desired to have a substantially clear space for gases above the top of the charge. When a more continuous operation is desired replenishment is at more frequent intervals. Or replenishment may be continuous, bell 7 being kept lowered sufficiently to give a small opening through which material falls continuously.

In the best way of manufacturing aluminum chloride under this invention of which we are at present aware, crude bauxite is dehydrated in a rotating kiln at a temperature of about 1800° F. No preliminary processing of the crude bauxite is required beyond crushing such lumps as may be present to a size which will permit ready calcination. It is difficult to thoroughly calcine bauxite in a rotating kiln in lumps larger than one inch cross section. The calcined bauxite is then mixed with petroleum coke in the ratio of approximately sixty parts by weight of the former to forty parts by weight of the latter, allowance being made for any volatils that may be in the coke. It is important that the coke used is not too coarse or too fine. If it is too coarse, the center of the charge will be too loose and channeling is apt to occur. If the coke is too fine, the center of the charge is apt to be too tight and difficulty is likely to be experienced in getting gas through the charge. The best material which we have used is that part of refinery coke breeze which will pass a one-half inch mesh screen. Other kinds of coke may be used, but they add greater amounts of ash rich in silica to the reaction zone and, to that extent, tend to waste chlorin. It is best to use the charge materials in a hot state and for this reason after weighing and mixing the bauxite and coke, we customarily heat the mixture in a retort or the like. This preliminary heating also drives out any volatils such as moisture and hydrocarbons in the coke and any moisture which the calcined bauxite may have taken up in handling or transit and brings the charge to a sufficient temperature to ignite with oxygen in the chlorinating shaft, such temperature being usually not less than 1100° F. The heated mixture of coke and bauxite withdrawn from the retort is charged into the shaft zone to form a column eight to ten feet high. Into this shaft is passed a draft current containing chlorin and oxygen. Generally, we use the two in the volume ratio of 1 part oxygen to 3.33 of chlorin. The mixture of coke and bauxite being hot, (usually as least 1100° F.) the coke ignites as soon as the draft current strikes it and there is created a zone of local intense temperature, and a crater forms. Most of the reaction is in the upper part of this crater. Some reaction however takes place to a depth of two feet or more; and, as stated, we regard it advisable to keep a minimum height of column of about 2 feet. With oxygen it frequently happens that the localization of heat is too great and temperatures are developed which tend to melt or sinter the charge and interfere with permeability; this being particularly true with low grade bauxite. It has been found (copending application of A. M. McAfee, Serial No. 222,109, filed Sept. 26, 1927) that the best results are obtained with the use of particular mixtures of oxygen and nitrogen, as there is thereby obtained a better type of localization. Air carries about 79 per cent by volume of nitrogen (and argon) with 21 per cent of oxygen. It is found that the best results are obtained where the proportion of nitrogen is not more than equal to the oxygen; that is nitrogen is not present in greater than a 50:50 ratio. On the other hand, it is generally advisable to have at least 20 parts of nitrogen for 80 parts of oxygen. Ordinarily it is best to use a ratio of 40:60, the ratio being varied somewhat with the observed thermal tendency in the apparatus. In starting with a fresh charge it is in general advisable to have somewhat less nitrogen present than toward the end of the operation on account of accumulated heat. In a general way however the ratio 40:60 is a good one. A diluted oxygen having this ratio may be obtained by directly mixing therewith nitrogen coming from an air liquefying plant supplying the oxygen. This nitrogen has the advantage of being completely dry. Or the ratio may be obtained by admixing ordinary air (which should be first dried) with the oxygen. A mixture of equal volumes of air and oxygen will give a nitrogen:oxygen ratio of 40:60.

What we claim is:—

1. In the manufacture of aluminum chloride from bauxite and coke the process which comprises establishing a hot vertical column of a mixture of coke and bauxite in a suitable reaction chamber with coarser material nearer the axis than at the periphery, and supplying a reaction supporting draft current comprising chlorin to one end face of said column with withdrawal of products of reaction at the other end face of said column.

2. In the manufacture of aluminum chloride from beauxite and coke the process which comprises establishing a hot vertical column of a mixture of coke and bauxite in a suitable reaction chamber with coarser material nearer the axis than at the periphery, and supplying a reaction supporting draft current comprising chlorin and oxygen to the upper face of said column with withdrawal of products of reaction at the base of said column.

3. In the manufacture of aluminum chloride from bauxite and coke the process which comprises establishing a hot vertical column of a mixture of coke and bauxite in a suitable reaction chamber with coarser material nearer the axis than at the periphery, and supplying a reaction supporting draft current comprising chlorin, oxygen and nitrogen to the upper face of said column with withdrawal of products of reaction at the base of said column.

4. In the manufacture of aluminum chloride from bauxite and coke the process which comprises establishing a hot vertical column of a mixture of coke and bauxite in a suitable reaction chamber with coarser material nearer the axis than at the periphery, and supplying a reaction supporting draft current comprising chlorin, oxygen and nitrogen, the proportion of nitrogen to oxygen being less than that existing in air, to the upper face of said column with withdrawal of products of reaction at the base of said column.

5. In the manufacture of aluminum chloride with the aid of chlorin and oxygen, from a hot mixture of bauxite and coke maintained as a columnar mass in a vertical shaft chamber, the process of lengthening the life of the shaft walls which comprises maintaining the axis of said charge more permeable than the periphery.

6. In the manufacture of aluminum chloride with the aid of chlorin and oxygen, from a mixture of bauxite and coke maintained as a columnar mass in a vertical shaft chamber, the process which comprises arranging conditions so that the maximum velocity of reaction is in the axis of said charge.

7. In the manufacture of aluminum chloride from a mixture of bauxite and coke maintained as a columnar reaction mass in a suitable vertical shaft chamber, the process which comprises passing a mixture of chlorin and oxygen with varying proportions of nitrogen axially through said column.

8. In the manufacture of aluminum chloride from a hot mass of a mixture of bauxite and coke in a suitable reaction chamber with the aid of chlorin carrying admixed oxygen, the process which comprises localizing the reaction caused by the draft current on one face of said mass at a point remote from the chamber walls while removing the products of reaction from an opposite face.

9. In the manufacture of aluminum chloride, the process which comprises establishing a vertical column of a mixture of aluminous material and carbon in a reaction chamber with coarser material nearer the axis than at the periphery and supplying a reaction supporting draft current comprising chlorin to the upper face of said column with withdrawal of products of reaction at the base of said column.

10. In the manufacture of aluminum chloride the process which comprises establishing a column of aluminous material and carbon in a reaction chamber with the center of the column more permeable to gases than the surrounding portion, and passing a mixture of chlorin and a combustion supporting gas under aluminum chloride producing conditions, through such column, whereby the gases will preferentially travel through the center thereof.

11. In the manufacture of aluminum chloride the process which comprises establishing a mass of aluminous material and carbon in a reaction chamber, grading the mass so that it is denser at the walls of the chamber than at other points, and passing a mixture of chlorin and combustion supporting gas under aluminum chloride producing conditions through the mass so that the gases preferentially travel in a path away from the walls of the chamber.

12. In the manufacture of aluminum chloride from bauxite and coke the process which comprises establishing a hot vertical column of a mixture of coke and bauxite in a suitable reaction chamber with coarser material nearer the axis than at the periphery, and supplying a reaction supporting draft current comprising chlorin to the upper face of said column with withdrawal of products of reaction at the base of said column.

In testimony whereof, we have hereunto affixed our signatures.

ALMER McDUFFIE McAFEE.
GERALD I. ROBERTS.